United States Patent [19]
Kettler

[11] Patent Number: 6,079,627
[45] Date of Patent: Jun. 27, 2000

[54] METHOD AND APPARATUS FOR MEASURING AIRFLOWS IN HVAC SYSTEMS

[75] Inventor: John Perlot Kettler, Shawnee, Kans.

[73] Assignee: York International Corporation, York, Pa.

[21] Appl. No.: 09/046,653

[22] Filed: Mar. 24, 1998

[51] Int. Cl.[7] .................................................. F24F 7/00
[52] U.S. Cl. ........................ 236/49.3; 454/229; 55/471
[58] Field of Search ........................... 236/49.3; 454/229, 454/256; 165/249, 250; 55/471

[56] References Cited

U.S. PATENT DOCUMENTS

| | | |
|---|---|---|
| 2,244,551 | 6/1941 | Crawford . |
| 4,043,196 | 8/1977 | Trageser ............................... 73/204.14 |
| 4,086,781 | 5/1978 | Brody et al. .............................. 62/180 |
| 4,392,417 | 7/1983 | Johannsen . |
| 5,791,408 | 8/1998 | Seem ..................................... 165/250 |
| 5,862,982 | 1/1999 | Federspiel ............................. 236/49.3 |
| 5,976,010 | 11/1999 | Reese et al. ............................ 454/229 |

Primary Examiner—Henry Bennett
Assistant Examiner—Melvin Jones
Attorney, Agent, or Firm—Finnegan, Henderson, Farabow, Garrett & Dunner, L.L.P.

[57] ABSTRACT

The present invention includes a method and apparatus for accurately measuring airflow across a measuring location within a heating, ventilation, and air conditioning system. The method includes the steps of measuring airflow at the measuring location using a plurality of airflow measuring stations of equal or different sizes, the sizes of the measuring stations together equaling the size of the measuring location. Control dampers are associated with each respective station to modulate the airflow through each measuring station based upon the flow condition across the measuring location. The apparatus providing for the method includes differential pressure transducers located in each airflow measuring station. These pressure transducers are connected with the dampers via a control unit which changes the position of the dampers in accordance with the airflow condition. The measuring locations can be adjacent an outdoor air inlet, a partial return air inlet, or heating and cooling coils of a heating, ventilation, and air conditioning unit.

32 Claims, 5 Drawing Sheets

DAMPER POSITION

| 1/3 DAMPER | 2/3 DAMPER | AIRFLOW CONDITION |
|---|---|---|
| OPEN | CLOSED | LOW FLOW |
| CLOSED | OPEN | INTERMEDIATE FLOW |
| OPEN | OPEN | HIGH FLOW |

| NUMBER AND SIZE OF MEASURING STATIONS | STATION OPEN | FLOW | FLOW VELOCITY | VELOCITY PRESSURE | REQUIRED RANGE OF VELOCITY PRESSURES |
|---|---|---|---|---|---|
| SINGLE | | | | | |
| | SINGLE | 200 (LOW) | 200 | .00249 | 1% |
| | SINGLE | 2000 (HIGH) | 2000 | .24938 | MAX (100%) |
| 1/2 & 1/2 | | | | | |
| | 1/2 | 200 (LOW) | 400 | .00998 | 4.0% |
| | 1/2 | 1000 (INTERMEDIATE) | 2000 | .24938 | 100% |
| | 1/2 + 1/2 | 1000 (HIGH) | 1000 | .06234 | 25.0% |
| 1/3 & 2/3 | | | | | |
| | 1/3 | 200 (LOW) | 600 | .02244 | 9.0% |
| | 1/3 | 667 (INTERMEDIATE) | 2000 | .24394 | 100% |
| | 2/3 | 667 (INTERMEDIATE) | 1000 | .06241 | 25.0% |
| | 2/3 | 1333 (HIGH) | 2000 | .24938 | 100% |
| | 1/3 + 2/3 | 1333 (HIGH) | 1333 | .11078 | 44.4% |
| 1/4 & 3/4 | | | | | |
| | 1/4 | 200 (LOW) | 800 | .03990 | 16.0% |
| | 1/4 | 500 (INTERMEDIATE) | 2000 | .24938 | 100% |
| | 3/4 | 500 (INTERMEDIATE) | 667 | .02771 | 11.1% |
| | 3/4 | 1500 (HIGH) | 2000 | .24938 | 100% |
| | 1/4 + 3/5 | 1500 (HIGH) | 1500 | .14027 | 56.2% |
| 1/5 & 4/5 | | | | | |
| | 1/5 | 200 (LOW) | 1000 | .06234 | 25.0% |
| | 1/5 | 400 (INTERMEDIATE) | 2000 | .24938 | 100% |
| | 4/5 | 400 (INTERMEDIATE) | 500 | .01559 | 6.2% |
| | 4/5 | 1600 (HIGH) | 2000 | .24938 | 100% |
| | 1/4 + 4/5 | 1600 (HIGH) | 1600 | .15960 | 64.0% |
| 1/5 & 2/5 & 2/5 | | | | | |
| | 1/5 | 200 (LOW) | 1000 | .06234 | 25.0% |
| | 1/5 | 400 (INTERMEDIATE) | 2000 | .24938 | 100% |
| | 2/5 | 400 (INTERMEDIATE) | 1000 | .06234 | 25.0% |
| | 2/5 | 800 (INTERMEDIATE) | 2000 | .24938 | 100% |
| | 1/5 + 2/5 | 800 (INTERMEDIATE) | 1333 | .11083 | 44.4% |
| | 1/5 + 2/5 | 1333 (HIGH) | 2000 | .24938 | 100% |
| | 1/5 + 2/5 + 2/5 | 1333 (HIGH) | 1333 | .11083 | 44.4% |

BASED UPON:
 TOTAL AREA (ALL STATIONS) = 1 SQ. FT.
 TOTAL (MAX) FLOW = 2000 CFM
 MIN. FLOW = 200 CFM

*FIG. 3*

METHOD AND APPARATUS FOR MEASURING AIRFLOWS IN HVAC SYSTEMS

BACKGROUND OF THE INVENTION

1. Field of the Invention

This invention relates to heating, ventilation, and air conditioning (HVAC) systems, and more particularly to a method and apparatus for measuring airflows in such systems.

2. Background of the Invention

Because of stiffer ventilation requirements and the never ending pursuit of the most efficient HVAC system, modern HVAC units have been called upon to provide a more accurate overall temperature and ventilation control. The key to such improved HVAC system control lies in part in the degree of accuracy obtained in measuring various system parameters. One important measured parameter is the ventilation rate provided by the HVAC system to a receiving zone. The ventilation rate is a measure of the amount of outdoor air delivered to a receiving zone over a given time and is indicative of the air quality within such a zone.

Because of the relationship between indoor air quality and the amount of outdoor air received in a receiving zone, air quality standards have been promulgated requiring a minimum volume of outdoor air that must be delivered to a receiving zone at any given airflow. Standard 62-1989, set forth by ASHRAE (the American Society of Heating, Refrigerating, and Air Conditioning Engineers), is such a standard and has been adopted by many building professionals. Thus, HVAC systems in compliance with such air quality standards must include a method of accurately determining whether the required amount of outdoor air is delivered by the HVAC unit.

Other parameters essential to the proper operation and control of an HVAC system include the amount of return air received by the HVAC unit and the total airflow across the HVAC system. Only with accurate airflow measurements of these parameters can precise control of the type and amount of air delivered to a receiving zone be obtained.

A problem encountered in accurately measuring airflow in HVAC units results from an inability to accurately sense the full range of airflows utilized by a given HVAC system. For example, pressure transducers in conventional systems cannot be relied upon to provide accurate pressure measurements over the complete airflow range utilized by an HVAC unit.

Various attempts have been made to overcome this airflow measuring problem. One such approach includes amplifying the airflow velocity at the measuring location and thereby increasing the velocity pressures to a higher, more accurately measurable value. Increasing the airflow velocity can be achieved by providing a flow restriction adjacent and upstream of the measuring location and utilizing the driving fan of the HVAC unit downstream of the measuring location. This technique is inefficient because of the large amount of energy required to increase the airflow velocity at the measuring location. Further, this method only raises the measured velocity pressure corresponding to a low airflow condition of the HVAC system, it does not affect the need for a pressure transducer capable of accurately measuring velocity pressures over the total airflow range of the HVAC system.

For the foregoing reasons and others, a need exists for a method and apparatus that accurately measures a full range of airflows across an HVAC system.

SUMMARY OF THE INVENTION

The advantages and purposes of the invention will be set forth in part in the description which follows, and in part will be obvious from the description, or may be learned by practice of the invention. These advantages and purposes will be realized and attained by way of the elements and combinations particularly pointed out in the appended claims.

To attain the advantages and in accordance with the purpose of the invention, as embodied and broadly described herein, the invention comprises a method of accurately measuring airflow across a measuring location within a heating, ventilation, and/or air conditioning system. The method includes the steps of measuring airflow at the measuring location using two or more airflow measuring stations, the areas of the measuring stations together equaling the area of the measuring location, and controlling at least one airflow control device to selectively vary the airflow through the airflow measuring stations based upon the measured airflow across the measuring location.

In another aspect, the invention comprises an airflow measuring apparatus for measuring airflow across a measuring location within a heating, ventilation, and/or air conditioning system. The airflow measuring apparatus includes at least two airflow measuring stations located at the measuring location for measuring airflow across the measuring location, the areas of the airflow measuring stations together totaling an area of the measuring location, and at least two airflow control devices, one associated with each respective airflow measuring station, for selectively varying the airflow within the respective airflow measuring station.

BRIEF DESCRIPTION OF THE DRAWINGS

The accompanying drawings, which are incorporated in and constitute a part of this specification, illustrate several embodiments of the invention and together with the description serve to explain the principles of the invention. In the drawings.

FIG. 3 is a table comparing the required velocity pressure measurement ranges for various embodiments of the invention to the required velocity pressure measurement range of a single stage airflow measuring apparatus;

DETAILED DESCRIPTION OF THE PREFERRED EMBODIMENTS

Reference will now be made in detail to the invention, examples of which are illustrated in the accompanying drawings. Wherever possible, the same reference numbers will be used throughout the drawings to refer to the same or like parts.

Figures 1, 2:
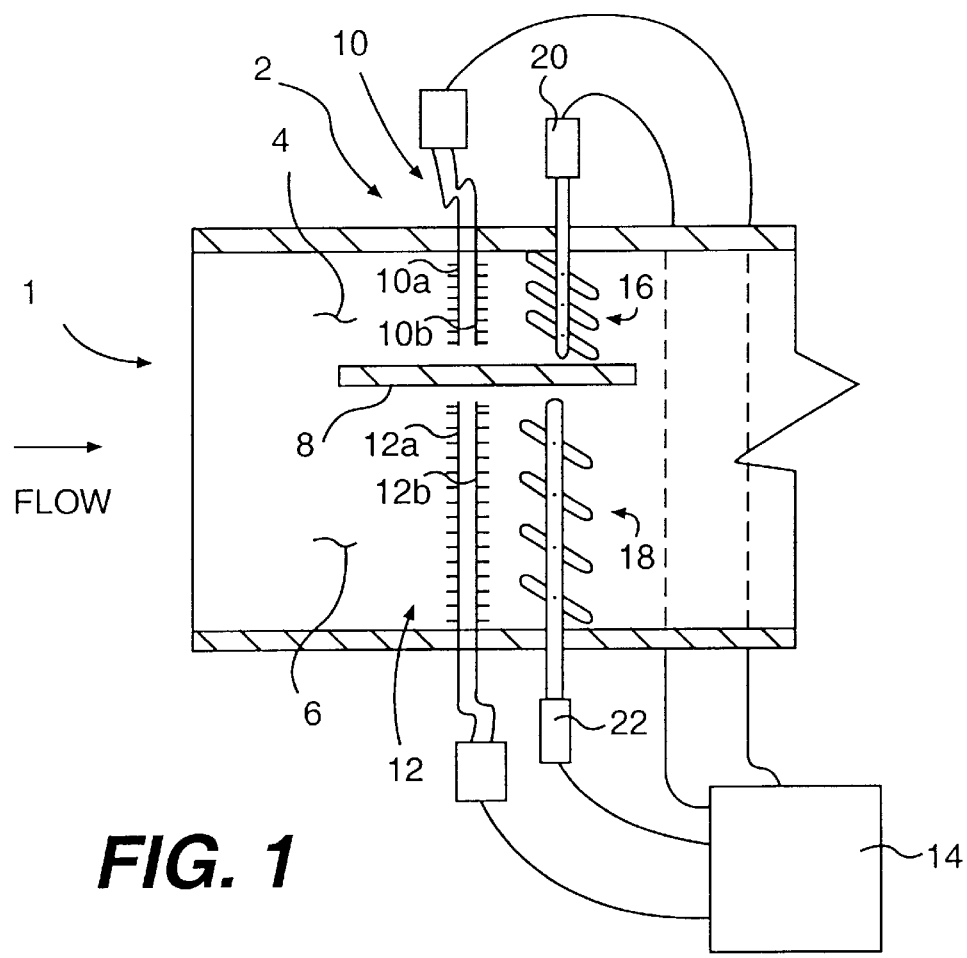
FIG. 1 is a schematic view of an airflow measuring apparatus according to a first embodiment of the present invention.
FIG. 2 is a table listing the various operating positions of the control dampers of the two stage airflow measuring station apparatus according to the first embodiment of the present invention.

An airflow measuring apparatus according to a first embodiment of the present invention is illustrated in FIG. 1. The airflow measuring apparatus 2 is located at a measuring location within an airflow conduit 1 and includes a first and second airflow measuring station 4, 6 separated by a partition member 8. Conduit 1 may be of any cross-section, but is preferably formed in a rectangular or circular configuration. Measuring stations 4, 6 are defined by the walls of conduit 1 and partition member 8 and may also be formed of a rectangular or semi-circular cross-section. The first embodiment of the present invention includes a measuring station 4 forming a smaller airflow area than measuring station 6, and both measuring stations 4, 6 together equal the total area of conduit 1. For example, measuring station 4 may be sized to one-third of the total area of conduit 1, and measuring station 6 may be sized to the remaining two-thirds of the total area of conduit 1. As described further below, other embodiments of the airflow measuring apparatus of the present invention include more than two measuring stations and measuring stations of equal or different sizes.

Each airflow measuring station 4, 6 includes an arrangement for measuring the flow of air through the measuring station. In a present preferred embodiment, differential pressure transducers 10, 12 are used for measuring a velocity pressure of the airflow across a respective measuring station 4, 6. Each pressure transducer 10, 12 projects into the airflow of its respective measuring station 4, 6 and is formed with a pair of straight probes (10a, 10b, 12a, and 12b), one probe measuring the in-flow pressure of the airflow and the other probe measuring the static pressures of the airflow. In another embodiment of the invention, a plurality of pressure transducers 10, 12 can be formed in a circular configuration within the flow area of airflow measuring stations 4, 6 to detect in-flow pressures and one or more other transducers can be positioned to measure static pressure. Regardless of the type of sensors used, the sensed pressures are sent to a control unit 14 where they are used to calculate an airflow value for each measuring station 4, 6. The relationship between the sensed values and the airflow can be determined through analytical calculations or empirical testing, as is known in the art. For example, when a probe type pressure transducer is used, the relationship of the various parameters are set forth by the equation:

airflow (cfm)=(velocity pressure (in. w.g.))$^{0.5}$ (measuring station area(ft$^2$)) (4005)(c)

wherein the value 4005 is a constant and the airflow value calculated is that flowing across a respective measuring station 4, 6 and (c) is a correction factor for air density and/or sensor amplification. The use of other measuring devices within the stations and the application of programs to determine the airflow based on the sensed values, is known in the art and can be applied to the invention.

Each measuring station 4, 6 further includes an airflow control device, such as control dampers 16, 18 located downstream of pressure transducers 10, 12. As one example, control dampers 16, 18 are of a pivoting horizontal vane type and are regulated by damper drive motors 20 and 22. Damper drive motors 20, 22 receive signals from control unit 14 to selectively position control dampers 16, 18 between an open position and a closed position. In one embodiment of the present invention, the positions of the control dampers 16, 18 are based upon the total airflow across conduit 1, as determined by control unit 14.

As an example, control dampers 16, 18 of the two measuring station 4, 6 airflow measuring apparatus 2 of the first embodiment are operated according to the table of FIG. 2. During low measured airflow, control damper 16 is moved to an open position and control damper 18 is held in a closed position. Thus, during low airflow conditions the total airflow is channeled through and measured only by measuring station 4. If the amount of airflow across measuring station 4 remains within a first predetermined low airflow range, as determined by control unit 14, control damper 16 will remain in an open position and control damper 18 will remain closed.

If the amount of airflow measured across measuring station 4 exceeds the first predetermined low airflow range, control unit 14 will close control damper 16 and open control damper 18. This closed—open operation of measuring stations 4, 6 corresponds to an increase in airflow from a low airflow across conduit 1 to an intermediate airflow across conduit 1. As long as the airflow measured by measuring station 6 remains within a second predetermined intermediate airflow range, control damper 18 will remain open and control damper 16 will remain closed.

If control unit 14 determines that the amount of airflow across measuring station 6 exceeds the second predetermined intermediate airflow range, both control dampers 16, 18 will be moved to an open position. This open—open condition of measuring stations 4, 6 corresponds to a high airflow condition across conduit 1. If only two airflow stations are used and they are of equal size, for low airflow only one of the sets of dampers is opened. Then when the airflow reaches a predetermined level, the second set of dampers is opened.

Utilizing the above described "staged" airflow across conduit 1, the airflow through each measuring station 4, 6 remains within a range appropriate for accurate measurement by pressure transducers 10 and 12. In a simple application of the present invention, the dampers can be altered only between a fully opened or a fully closed position. In the preferred embodiments described below, the dampers can be selectively positioned at a number of intermediate positions, to thereby obtain both accurate airflow measurements and precise airflow control across conduit 1.

Below is an example illustrating the advantages of using the staged airflow measuring apparatus 2 of the first embodiment of the present invention. Assuming an entire range of airflow across a 1 square foot conduit 1 varies between a low airflow of 200 cfm and a maximum airflow of 2,000 cfm, a single pressure transducer measuring the entire airflow would require a low airflow velocity pressure measurement of 1.0% of the maximum airflow velocity pressure measurement (100%). As noted above, consistent and accurate measurements over such a large range of velocity pressure values are difficult to achieve.

Considering the same range of airflow through a one-third, two-thirds ratio of measuring station areas according to the first embodiment of the present invention, airflow measuring apparatus 2 would require a low airflow velocity pressure measurement of 9.0% of the maximum airflow velocity pressure measurement for smaller airflow measuring station 4. Further, larger airflow measuring station 6 would require a low airflow velocity pressure measurement of 25.0% of the maximum airflow velocity pressure. This reduced range of velocity pressure values between low and maximum airflows is easily and accurately measured by pressure transducers 10, 12. Thus, instead of a single stage airflow measurement apparatus having a velocity pressure measurement range from 1.0% to 100% flow, the airflow measuring apparatus according to the first embodiment only requires a range from 9.0% to 100%, an increase of 9 times the low airflow velocity pressure measurement of the single stage airflow measuring apparatus.

The table of FIG. 3. sets forth the above comparison between the range of velocity pressure measurements for a single stage airflow measuring apparatus with that of the one-third, two-thirds airflow measuring apparatus according to the first embodiment of the present invention. The table of FIG. 3 further compares the required range of velocity pressure measurements for a single stage airflow measuring apparatus with that of various other embodiments of the present invention. These other embodiments of the present invention include all of the details of the first embodiment but differ in size and/or number of airflow measuring stations. Such embodiments include an airflow measuring apparatus having (1) two equal airflow measuring stations, (2) two airflow measuring stations sized one-forth and three-fourths, (3) two measuring stations sized one-fifth and four-fifths, and (4) three measuring stations sized one-fifth, two-fifths, and two-fifths.

The last column of the table of FIG. 3 lists the required range of velocity pressure measurements for the various embodiments as compared to the range of a single stage airflow measuring apparatus. Thus, assuming a total airflow measuring apparatus area of 1 square foot, a maximum airflow of 2000 cubic feet per minute, and a minimum airflow of 200 cubic feet per minute, the embodiment of the present invention utilizing two equally sized airflow measuring stations provides for a low velocity pressure measurement four times that of the single stage airflow measuring apparatus.

The various embodiments of the airflow measuring apparatus are intended for use in HVAC systems and can be applied at any location within such a system where accurate airflow measurement is desired. For example, and as detailed in the system embodiments below, measuring apparatus 2 may be located within an outdoor air inlet (FIG. 4), and/or a return air inlet (FIG. 5), and/or near heating and cooling coils of an HVAC unit (FIG. 6). Airflow measuring apparatus 2 may provide a simple visual readout of the airflow across a measuring location of the HVAC system and/or may be linked with a larger HVAC control unit for controlling the amount and temperature of air delivered to one or more receiving zones (not shown).

Figure 4:
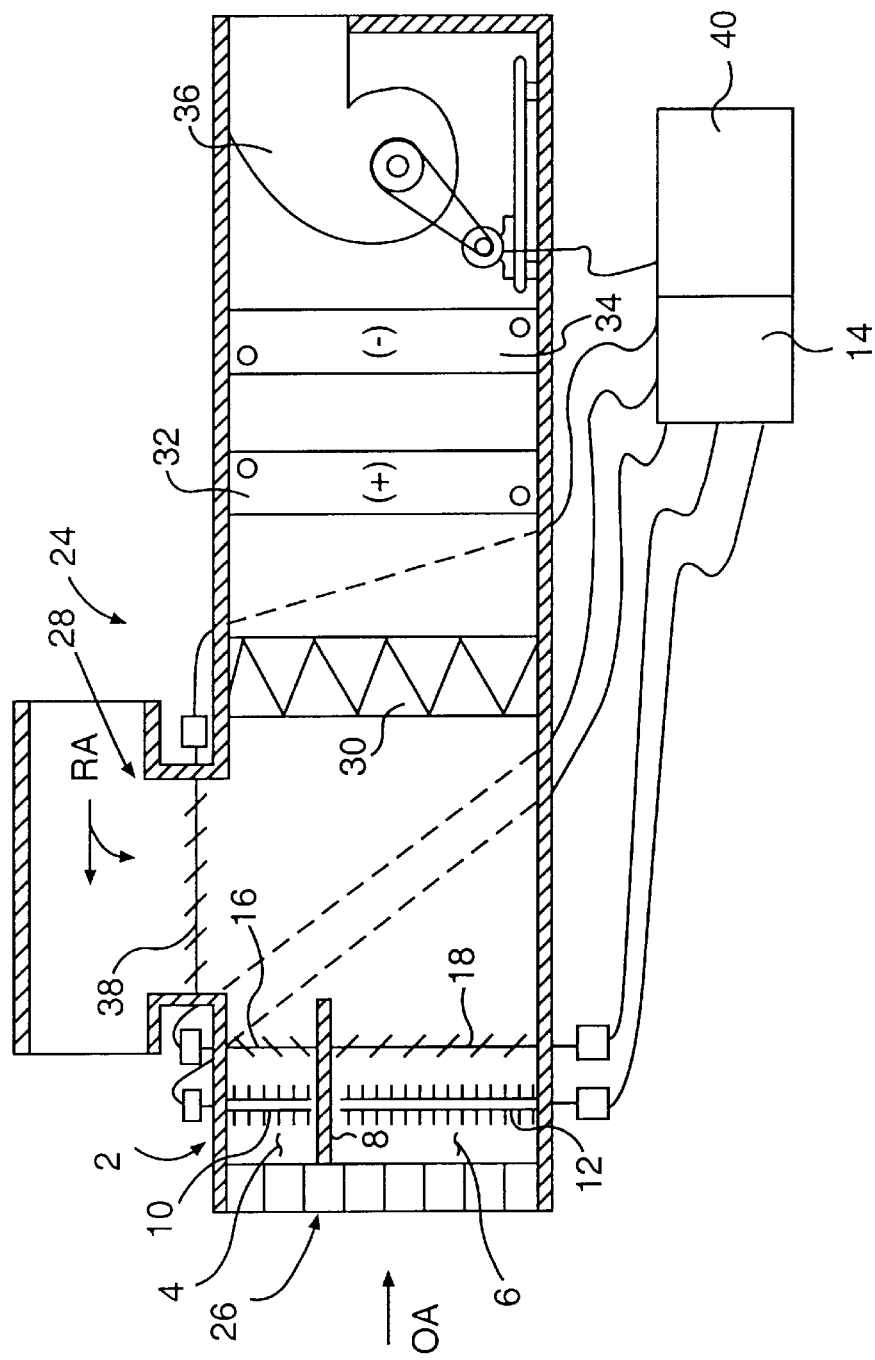
FIG. 4 is a schematic view of the airflow measuring apparatus within an HVAC unit according to a first system embodiment of the present invention.

FIG. 4 illustrates airflow measuring apparatus 2 within an HVAC unit 24 according to a first system embodiment of the present invention. The HVAC unit 24 may be of any type used in the industry, such as the unit described in U.S. Pat. No. 5,564,626 to Kettler et al., which is herein incorporated by reference. HVAC unit 24 generally includes an outdoor air inlet 26, a partial return air inlet 28, a filter 30, heating coils 32, cooling coils 34, and a motor driven fan unit 36. The airflow measuring apparatus 2 according to the first embodiment is located only in outdoor air inlet 26.

Control unit 14 may be integral or separate from an HVAC system control unit 40. In the preferred embodiment of FIG. 2, an integral control unit 14, 40 is linked to fan unit 36, airflow measuring apparatus 2, and a partial return air damper 38. The integral control unit 14, 40 provides for an opening and closing of control dampers 16, 18 based upon the measured airflow across the outdoor inlet 26 (as described with regard to FIG. 1) and also provides for a modulation of control dampers 16, 18 between a fully open and partially open position based upon a required temperature and amount of air necessary at one or more receiving zones (not shown). Integral control unit 14, 40 can be programmed to selectively open and close the dampers 16, 18 to provide both optimum measurement and optimum relative airflow of return air and outside air, to provide optimum ratios and mixing. If control unit 14 is separate from system control unit 40, measurement values obtained from control unit 14 may be outputted to a display and utilized to separately adjust dampers 16, 18 irrespective of system control 40.

Figure 5:
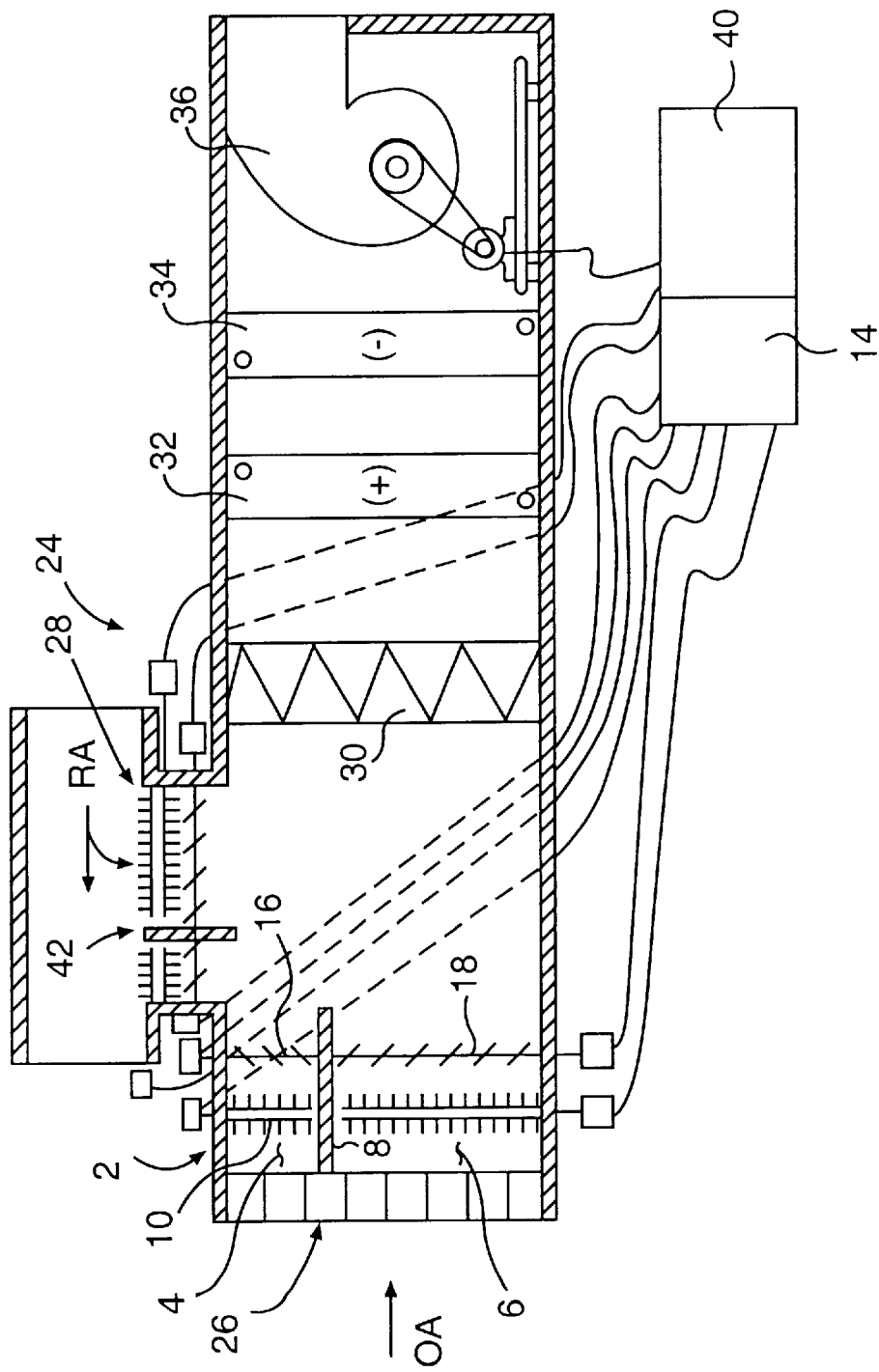
FIG. 5 is a schematic view of the airflow measuring apparatus within an HVAC unit according to a second system embodiment of the present invention.
Figure 6:
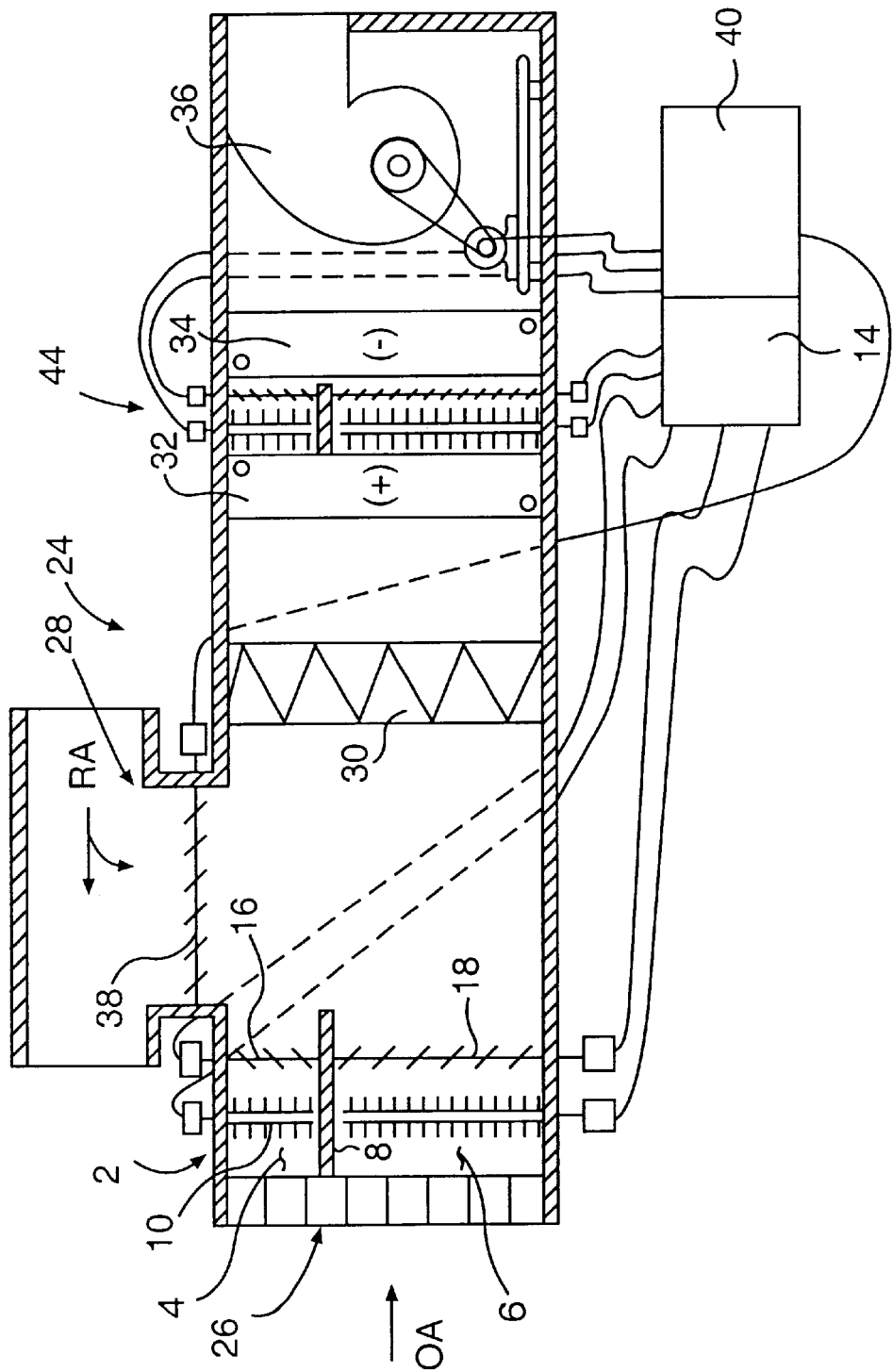
FIG. 6 is a schematic view of the airflow measuring apparatus within an HVAC unit according to a third system embodiment of the present invention.

According to a second system embodiment of the present invention illustrated in FIG. 5, a second airflow measuring apparatus 42 is included in partial return air inlet 28. As is known, some return air from the receiving zones being conditioned is often directed to the outside while the remaining return air is fed back to the HVAC system where it is heated or cooled with outside air introduced to unit 24. Airflow measuring apparatus 42 includes all of the aspects detailed above with regard to airflow measuring apparatus 2 of the first embodiment of the present invention but is utilized to accurately measure the airflow across partial return air inlet 28 of HVAC unit 24. In this system embodiment, complete airflow through HVAC unit 24 and the percentage thereof of outdoor air can be calculated and accurately controlled through integral control unit 14, 40 from the values obtained by apparatus 2 and 42.

According to a third system embodiment of the present invention illustrated in FIG. 6, a second airflow measuring apparatus 44 is included between heating coils 32 and cooling coils 34. Airflow measuring apparatus 44 includes all of the aspects detailed above with regard to airflow measuring apparatus 2 of the first embodiment of the present invention but is incorporated in HVAC unit 24 to accurately determine the total airflow within the unit. With this system embodiment, the percentage of outdoor air to total air can be calculated and controlled through control units 14 and 40 from the values obtained by measuring apparatus 2 and 44.

The various embodiments of the airflow measuring apparatus can be incorporated within most, if not all, conventional HVAC systems which require airflow measurements and/or control of the amount and temperature of air received and delivered by an HVAC unit. The various embodiments of the airflow measuring apparatus may be manufactured as a component of the original HVAC unit 24 or may be retrofit into an existing HVAC unit. For example, a unit like that illustrated in FIG. 1 can be made as an airflow measuring retrofit component that can be inserted at a measuring location within a conduit of an existing HVAC system, either as a new measuring device or as a replacement for an existing measuring device. The retrofit component would included at least two measuring stations, airflow control devices (such as dampers) for each measuring station, airflow sensors (such as pressure transducers), and a control unit for selectively operating the air airflow control devices, according to the sensed airflow. Similarly to that detailed above, the retrofit control unit could be incorporated with an existing HVAC system control unit or may remain separate therefrom.

According to another aspect of the present invention, the differential pressure transducers 10, 12 could be replaced with any other type of sensors that can sense parameters representative of airflow, such as "hot wire" anemometers or vortex shedding measuring stations. Further, this invention contemplates utilizing any type of airflow control device, such as controllable dampers or variable speed fans.

It will also be apparent to those skilled in the art that various modifications and variations can be made in the disclosed method and apparatus without departing from the scope or spirit of the invention. Other embodiments of the invention will be apparent to those skilled in the art from consideration of the specification and practice of the invention disclosed herein. It is intended that the specification and examples be considered as exemplary only, with the full scope of the invention being defined by the following claims.

What is claimed is:

1. A method of accurately measuring airflow across a measuring location within a heating, ventilation, and/or air conditioning system comprising the steps of:

measuring airflow at the measuring location using two or more airflow measuring stations, the areas of the measuring stations together equaling the area of the measuring location, the airflow measuring step including measuring total airflow across the measuring location through a first airflow measuring station during a low airflow condition at the measuring location, measuring total airflow across the measuring location through all airflow measuring stations during a high airflow condition at the measuring location, and controlling at least one airflow control device to selectively vary the airflow through the airflow measuring stations based upon the measured airflow across the measuring location, wherein the at least one airflow control device includes a first control device associated with the first measuring station and a second control device associated with a second measuring station, the controlling step further including opening only the first control device during the low airflow condition across the measuring location, and closing the first control device and opening the second control device during an intermediate airflow condition across the measuring location.

2. The method of accurately measuring airflow according to claim 1, further including the steps of:

opening both the first control device and the second control device during the high airflow condition.

3. The method of accurately measuring airflow according to claim 2, wherein:

the first and second control devices include associated first and second dampers, at least one of the dampers being opened to varying degrees based on a required airflow across the measuring location.

4. The method of accurately measuring airflow according to claim 3, wherein:

the required airflow across the measuring location is determined by a system control unit based upon airflow and temperature demands of the heating, ventilation, and/or air conditioning system.

5. The method of accurately measuring airflow according to claim 1, wherein:

the measuring location is adjacent an outdoor air inlet of a heating, ventilation, and/or air conditioning unit.

6. The method of accurately measuring airflow according to claim 1, wherein:

the measuring location is adjacent a partial return air inlet of a heating, ventilation, and/or air conditioning unit.

7. The method of accurately measuring airflow according to claim 1, wherein:

the measuring location is adjacent heating and cooling coils of a heating, ventilation, and/or air conditioning unit.

8. The method of accurately measuring airflow according to claim 1, wherein:

the second measuring station is larger than the first measuring station.

9. The method of accurately measuring airflow according to claim 8, wherein:

the first and second control devices include associated first and second dampers, at least one of the dampers being opened to varying degrees based on a required airflow across the measuring location.

10. The method of accurately measuring airflow according to claim 9, wherein:

the required airflow across the measuring location is determined by a system control unit based upon airflow and temperature demands of the heating, ventilation, and/or air conditioning system.

11. The method of accurately measuring airflow according to claim 8, wherein:

the measuring location is adjacent an outdoor air inlet of a heating, ventilation, and/or air conditioning unit.

12. The method of accurately measuring airflow according to claim 8, wherein:

the measuring location is adjacent a partial return air inlet of a heating, ventilation, and/or air conditioning unit.

13. The method of accurately measuring airflow according to claim 8, wherein:

the measuring location is adjacent heating and cooling coils of a heating, ventilation, and/or air conditioning unit.

14. The method of accurately measuring airflow according to claim 1, further comprising the steps of:

measuring total airflow across the measuring location through the second and a third airflow measuring station during a second intermediate airflow condition at the measuring location, the second intermediate airflow condition being larger than said intermediate airflow condition.

15. The method of accurately measuring airflow according to claim 14, wherein:

the at least one airflow control device includes a third control device associated with the third airflow measuring station, the method further including the steps of:

opening the first and second control devices during the second intermediate airflow condition, and opening the first, second, and third control device during the high airflow condition.

16. The method of accurately measuring airflow according to claim 15, wherein:

the first, second, and third control devices include associated first, second, and third dampers, at least one of the dampers being opened to varying degrees based on a required airflow across the measuring location.

17. The method of accurately measuring airflow according to claim 16, wherein:

the required airflow across the measuring location is determined by a system control unit based upon airflow and temperature demands of the heating, ventilation, and/or air conditioning system.

18. The method of accurately measuring airflow according to claim 14, wherein:

the measuring location is adjacent an outdoor air inlet of a heating, ventilation, and/or air conditioning unit.

19. The method of accurately measuring airflow according to claim 14, wherein:

the measuring location is adjacent a partial return air inlet of a heating, ventilation, and/or air conditioning unit.

20. The method of accurately measuring airflow according to claim 14, wherein:

the measuring location is adjacent heating and cooling coils of a heating, ventilation, and/or air conditioning unit.

21. An airflow measuring apparatus for measuring airflow across a measuring location within a heating, ventilation, and/or air conditioning system comprising:

at least two airflow measuring stations located at the measuring location for measuring airflow across the measuring location, the areas of the airflow measuring stations together totaling an area of the measuring location, and at least two airflow control devices, one associated with each respective airflow measuring station, for selectively varying the airflow within the respective airflow measuring station.

22. The airflow measuring apparatus according to claim 21, wherein:

at least two of the at least two airflow measuring stations differ in size.

23. The airflow measuring apparatus according to claim 22, wherein:

the at least two airflow measuring stations include a first airflow measuring station with first airflow sensor and a second airflow measuring station with second airflow sensor;

the at least two airflow control devices include a first airflow control device associated with the first measuring station and a second airflow control device associated with the second airflow measuring station; and the first and second airflow sensors and the first and second airflow control devices are integrated with a control unit for determining the airflow across the measuring location and controlling the position of the first and second airflow control devices based upon at least one of a required and measured airflow across the measured location.

24. The airflow measuring apparatus according to claim 23, wherein:

the first and second airflow control devices are variable dampers.

25. The airflow measuring apparatus according to claim 23, wherein:

the first and second airflow sensors are differential pressure sensors.

26. The airflow measuring apparatus according to claim 23, wherein:

the first and second airflow sensors are pressure sensors of the pilot tube type and each includes a first and second measuring probe.

27. The airflow measuring apparatus according to claim 21, wherein:

the at least two airflow measuring stations include a first airflow measuring station with first airflow sensor and a second airflow measuring station with second airflow sensor;

the at least two airflow control devices include a first airflow control device associated with the first measuring station and a second airflow control device associated with the second airflow measuring station; and the first and second airflow sensors and the first and second airflow control devices are integrated with a control unit for determining the airflow across the measuring location and controlling the position of the first and second airflow control devices based upon at least one of a required and measured airflow across the measured location.

28. The airflow measuring apparatus according to claim 25, wherein:

an area of the second airflow measuring station is greater than that of an area of the first airflow measuring station.

29. The airflow measuring apparatus according to claim 21, wherein:

the at least two airflow measuring stations include a first airflow measuring station with first airflow sensor, second airflow measuring station with second airflow sensor, and third airflow measuring station with third airflow sensor;

the at least two airflow control devices include a first airflow control device associated with the first measuring station, a second airflow control device associated with the second airflow measuring station, and a third airflow control device associated with the third airflow measuring station; and the first, second, and third airflow sensors and the first, second, and third airflow control devices are integrated with a control unit for determining the airflow across the measuring location and controlling the position of the first, second, and third airflow control devices based upon at least one of a required and measured airflow across the measured location.

30. The airflow measuring apparatus according to claim 29, wherein:

the first, second, and third airflow control devices are variable dampers.

31. The airflow measuring apparatus according to claim 29, wherein the first, second, and third airflow sensors are differential pressure sensors.

32. The airflow measuring apparatus according to claim 29, wherein the first, second, and third airflow sensors are pressure sensors of the pilot tube type and each includes a first, second, and third measuring probe.

* * * * *

UNITED STATES PATENT AND TRADEMARK OFFICE
CERTIFICATE OF CORRECTION

PATENT NO. : 6,079,627
DATED : June 27, 2000
INVENTOR(S) : John P. Kettler

It is certified that error appears in the above-identified patent and that said Letters Patent is hereby corrected as shown below:

<u>Claim 28, Column 10,</u>
Line 14, change "claim 25" to -- claim 27 --.

Signed and Sealed this

Eighteenth Day of September, 2001

Attest:

NICHOLAS P. GODICI
*Attesting Officer*    *Acting Director of the United States Patent and Trademark Office*